April 16, 1935. G. N. WILLIAMS Re. 19,542

MACHINE FOR WELDING METALLIC ARTICLES

Original Filed Oct. 3, 1932 7 Sheets-Sheet 1

Inventor:
George N. Williams
By: La Port & La Porte
Atty's.

April 16, 1935. G. N. WILLIAMS Re. 19,542
MACHINE FOR WELDING METALLIC ARTICLES
Original Filed Oct. 3, 1932 7 Sheets-Sheet 2
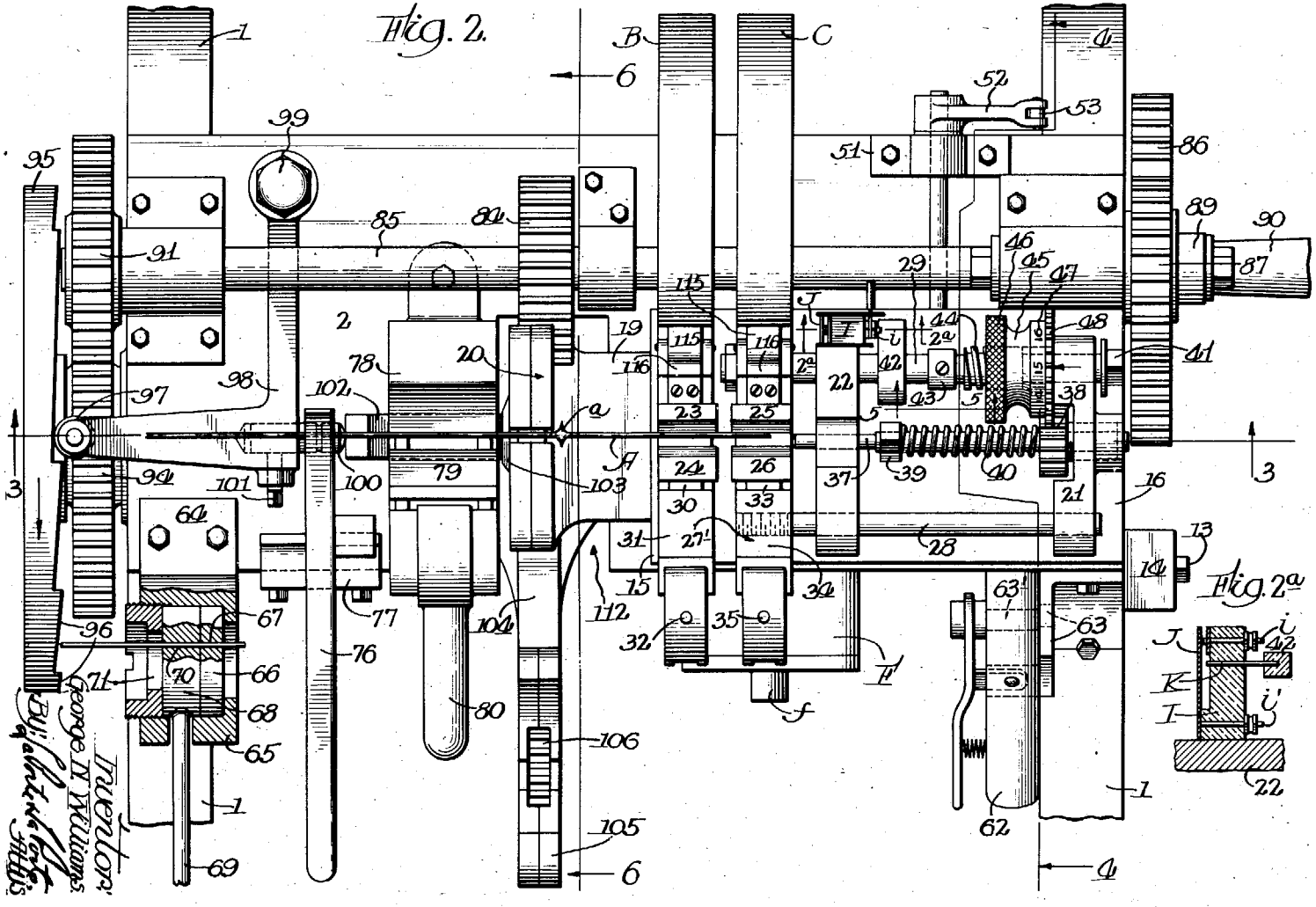

April 16, 1935. G. N. WILLIAMS Re. 19,542

MACHINE FOR WELDING METALLIC ARTICLES

Original Filed Oct. 3, 1932 7 Sheets-Sheet 3

Inventor:
George N. Williams.
By: La Porte & La Porte Atty's.

April 16, 1935. G. N. WILLIAMS Re. 19,542
MACHINE FOR WELDING METALLIC ARTICLES
Original Filed Oct. 3, 1932 7 Sheets-Sheet 4
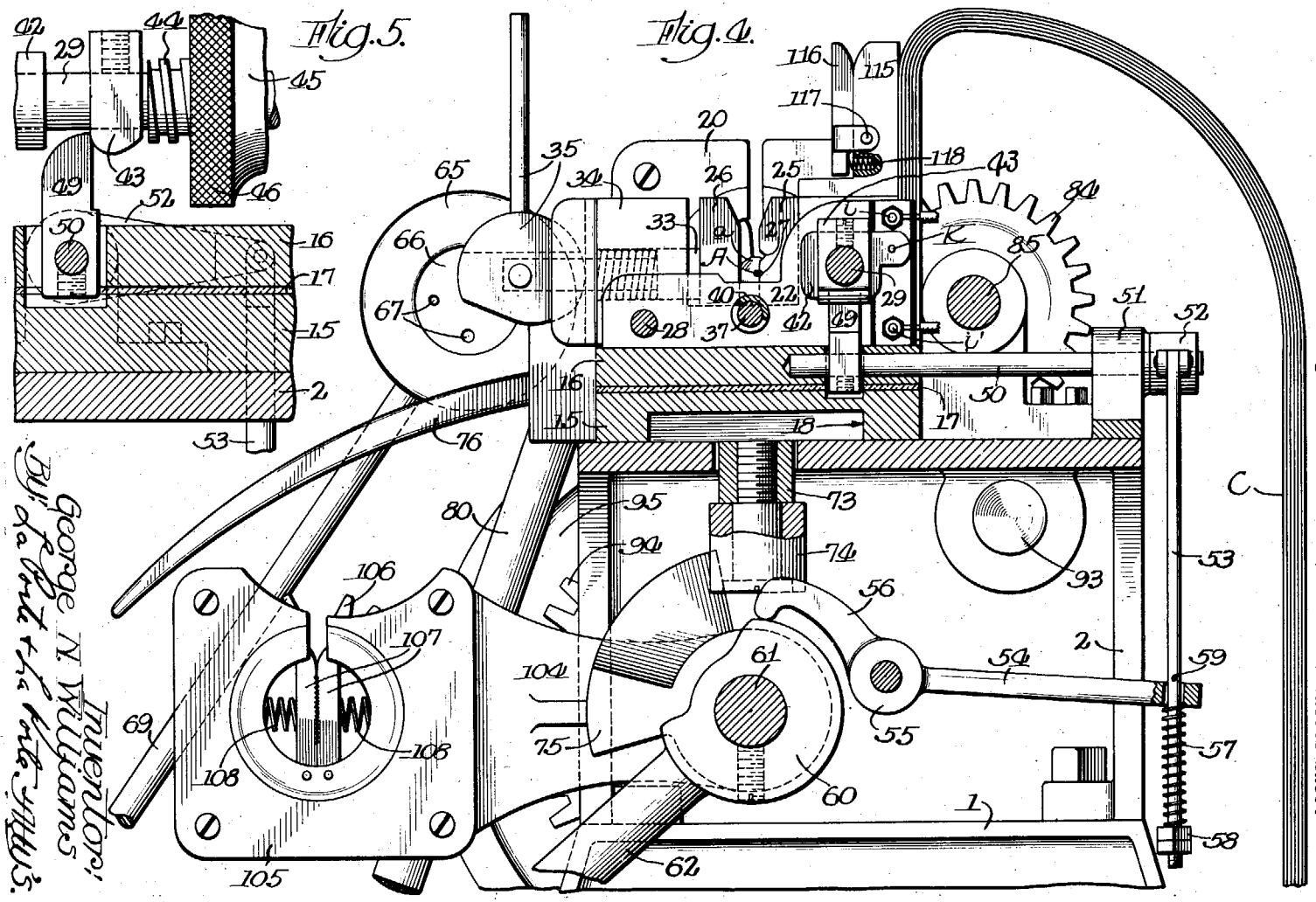

April 16, 1935. G. N. WILLIAMS Re. 19,542
MACHINE FOR WELDING METALLIC ARTICLES
Original Filed Oct. 3, 1932 7 Sheets-Sheet 5
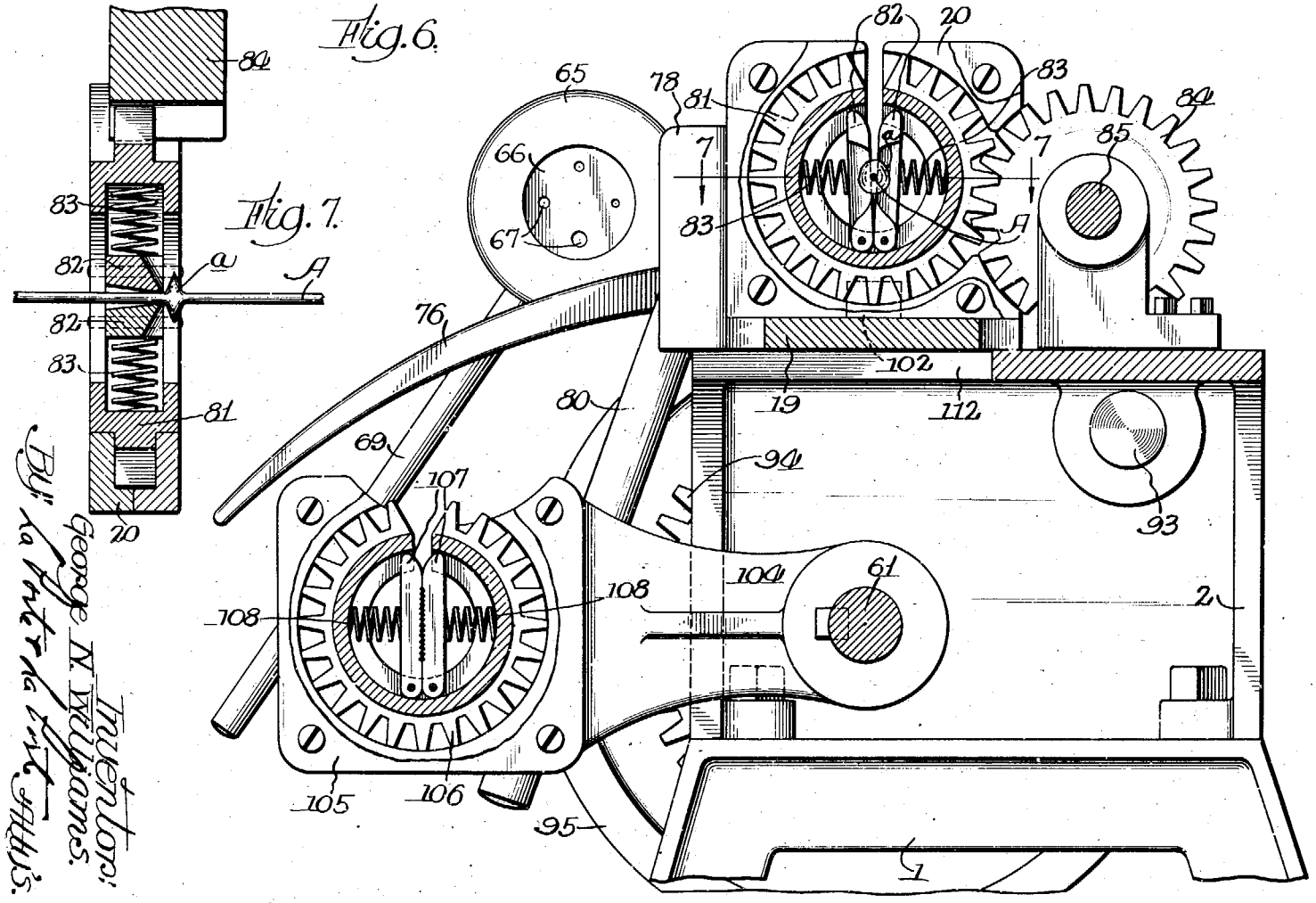

April 16, 1935. G. N. WILLIAMS Re. 19,542

MACHINE FOR WELDING METALLIC ARTICLES

Original Filed Oct. 3, 1932 7 Sheets-Sheet 6

Inventor:
George N. Williams
By: La Port & La Port Att'ys.

April 16, 1935. G. N. WILLIAMS Re. 19,542

MACHINE FOR WELDING METALLIC ARTICLES

Original Filed Oct. 3, 1932 7 Sheets-Sheet 7

Inventor:
George N. Williams.
By: La Porte & Dort Atty's.

Reissued Apr. 16, 1935

Re. 19,542

UNITED STATES PATENT OFFICE 19,542

MACHINE FOR WELDING METALLIC ARTICLES

George N. Williams, Kokomo, Ind., assignor to Continental Steel Corporation, Kokomo, Ind., a corporation of Indiana Original No. 1,978,776, dated October 30, 1934, Serial No. 635,985, October 3, 1932. Application for reissue January 16, 1935, Serial No. 2,054

20 Claims. (Cl. 140—112)

This invention has reference to a machine for welding metallic articles, as for example, the abutting ends of iron or steel wire, although it may be found useful for welding other and various articles either ferrous or non-ferrous.

The various steps of welding metallic articles include the preparation of the ends of the articles to be welded; affixing the ends of the articles to be welded, in predetermined relation to accommodate the proper and effective fusing of the abutting ends of such articles; welding the abutting ends of the articles by fusion through the application of heat; initially cutting or reducing burrs formed as a result of the welding action, and finally dressing or smoothing down such burrs or enlargements at the juncture of the weld and if desirable or because of the nature of the material of the articles, annealing the same throughout the area of the weld and the area affected thereby.

The invention has for one of its objects to improve the dies for holding the abutting ends of the articles during the welding thereof and to the means for predeterminately setting the dies for the effective welding of materials of varying gauges or sizes.

A further object of the invention is the means or mechanism employed to initially reduce burrs or enlargements occurring as the result of the welding operation, due to the fusing action and, furthermore, to the means or mechanism for finally dressing or smoothing down the area of the welded ends of the articles to the diameter of such articles, especially if such articles should be wire or articles having the characteristics of wire.

A still further object of the invention is a means or mechanism for annealing the articles throughout the area of the weld and the area affected thereby. This means is desirable, especially when welding the abutting ends of iron or steel wires which become hard and stiff, whereby to resoften the wire that it may have the same consistency throughout and be readily adapted to wire working machines of different kinds.

In the carrying out of the invention the various and several elements are combined compactly in a single portable machine that it may be readily and easily moved from one place to another for use at the point of work and preferably embodies electrical appliances whereby to weld electrically.

Other and further objects will more fully appear from the following description.

That the invention may be more fully understood, reference is had to the accompanying drawings forming a part of this description, illustrating a preferred embodiment of the invention, in which:—

Fig. 1 is an end elevation of my improved machine, certain of the dotted lines shown therein indicating operative positions of the handle bar elements for lifting and wheeling the machine from place to place and the other dotted lines indicating operative positions assumed by the main control lever during the operation of the machine;

Fig. 1[a] is a rear view in elevation of the base construction of said machine and particularly the wheeling elements for lifting and wheeling the machine from place to place;

Fig. 1[b] is a detail view in elevation of the construction shown in Figs. 1 and 1[a], however, showing the wheeling elements in operative position whereby the machine is lifted ready to be wheeled from place to place;

Fig. 2 is a top plan view of my improved machine, certain of the operative elements being shown in section and other parts broken away;

Fig. 2[a] is a sectional view in elevation as the same would appear if taken on the line 2[a]—2[a] of Fig. 2;

Fig. 4 is a sectional view in elevation as the same would appear if taken on the line 4—4 of Fig. 2;

Fig. 5 is an enlarged detail view of the stopping and tripping mechanism as the same would appear if taken on the line 5—5 of Fig. 2, also shown in Fig. 4;

Fig. 6 is an elevation partly in section of the burr removing elements, as the same would appear if taken on the line 6—6 of Fig. 2;

Fig. 7 is an enlarged sectional view in plan of the initial burr removing element showing the cutters thereof in active burr removing relation with a burr of a section of welded wire, as the same would appear if taken on the line 7—7 of Fig. 6;

Figure 11:
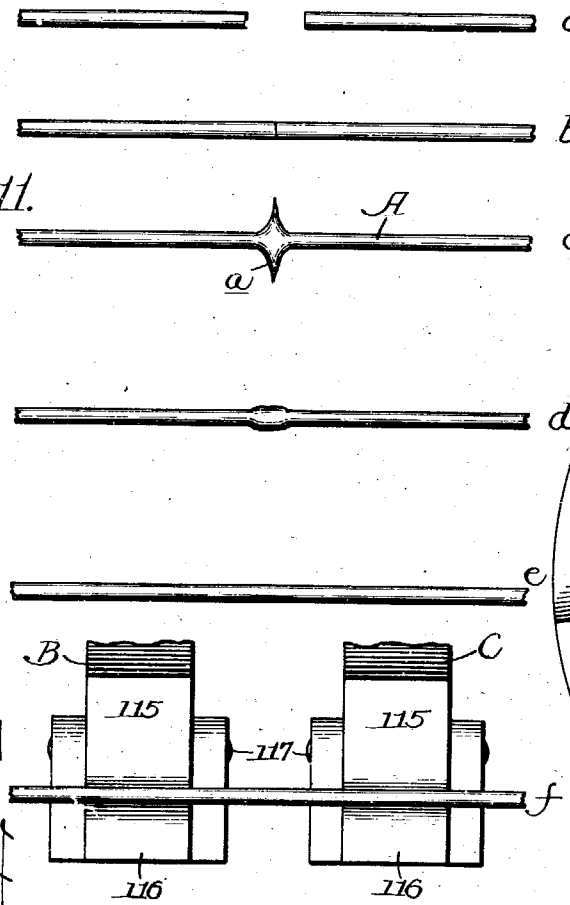

Fig. 11, by a series of illustrations, shows the successive steps in the preparation, welding, burr removing and annealing of two metallic articles, as for example, two pieces of wire; the view (*a*) showing the two pieces of wire as having their respective ends severed preparatory to welding; the view (*b*) showing the two pieces of wire in abutting relation preparatory to welding; the view (*c*) showing the two pieces of wire welded with the resulting burr formed at the weld; the view (*d*) showing the burr in the process of being dressed or smoothed down; the view (*e*) showing the welded article smoothed and dressed down, and the view (*f*) showing the welded article being annealed.

Like characters of reference denote corresponding parts throughout the figures.

*Frame structure*

The frame structure includes preferably the spaced end supports or standards 1 of a substantially inverted V outline and connected to and supported by these standards is a bed frame 2. Connecting the standards within the body portions is a shelf or platform 3 adapted to support elements of electrical power furnishing appliances by means of which the welding action on the articles to be welded may be accomplished by electricity.

Figure 1:
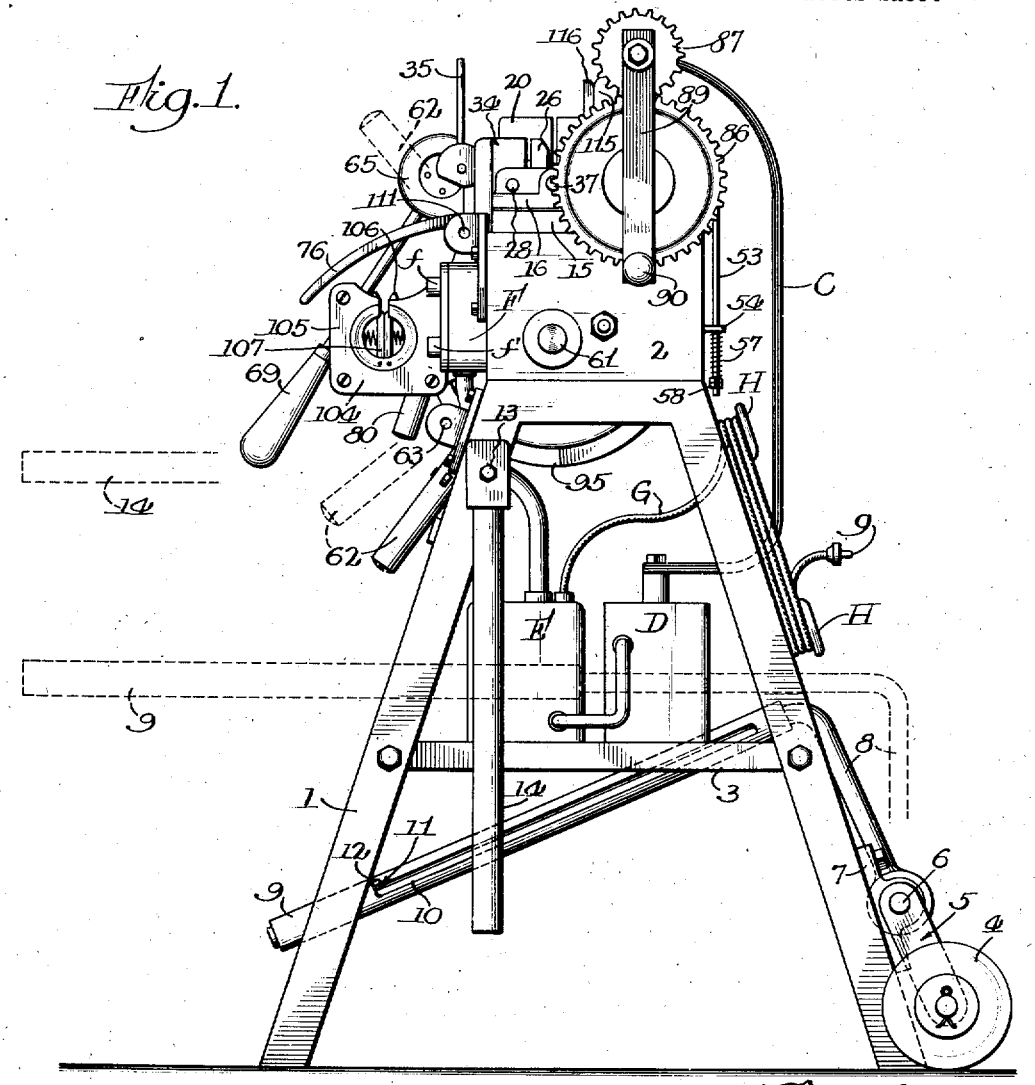
Figure 1A:
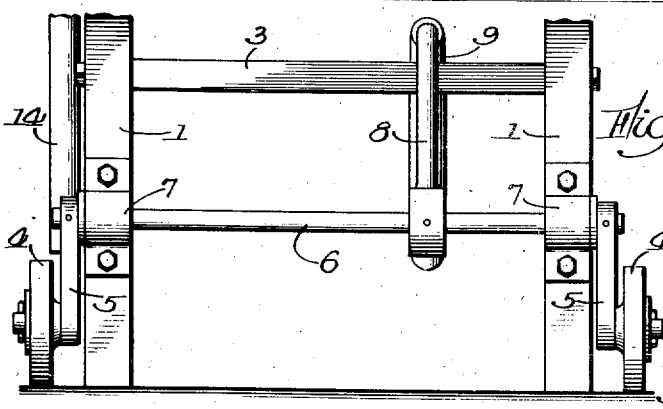
Figure 1B:
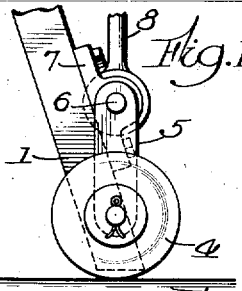

The entire machine is designed as a portable structure and is provided with traction wheels so that it may be conveniently and easily moved from one place to another. I accomplish this through the provision of the pair of traction wheels 4 which are journaled on arms 5, said arms having a pivotal connection with a common supporting bar or rod 6 supported by bearings 7 on the standards 1. Between the standards, at a suitable point, there is connected with the rod or bar 6 an angularly shaped lever bar 8 which normally inclines upwardly, forwardly and downwardly through the frame and the longer portion of said bar, as shown in Fig. 1, has a telescopic relation in a sleeve-handle 9 which, as shown, is slotted at 10 for the greater portion of its length and at its forward end having the offset notch 11 in which slot and notch operates a pin 12 secured to the lever bar 8, as shown. To one of the standards 1 is pivotally connected, at 13, the lever bar 14 which, together with the sleeve-handle 9 and its associated lever bar 8, serve as handle bars by means of which an attendant may tilt and raise the front side of the machine so that the entire machine is capable of being moved on its traction wheels from one place to another. As will be observed, the lever bar 14, when swung into its dotted line position, see Fig. 1, provides an efficient grip in one hand of the attendant and with the other hand he will grasp the lever handle 9 and oscillate it slightly to release the pin 12 from the notch 11, while at the same time pulling outwardly and lifting upwardly said handle 9 into the position shown in dotted lines in Fig. 1, resulting in lifting the rear portion of the frame from off of the floor to be supported by the traction wheels as shown in Fig. 1[b], in which position it will be obvious that the machine can be conveniently and easily transported. Reversing the operation of the movable parts, just described, will restore the machine to the stationary position it is seen occupying in Fig. 1 and the handle bars into their normal out of the way inoperative position.

Figure 3:
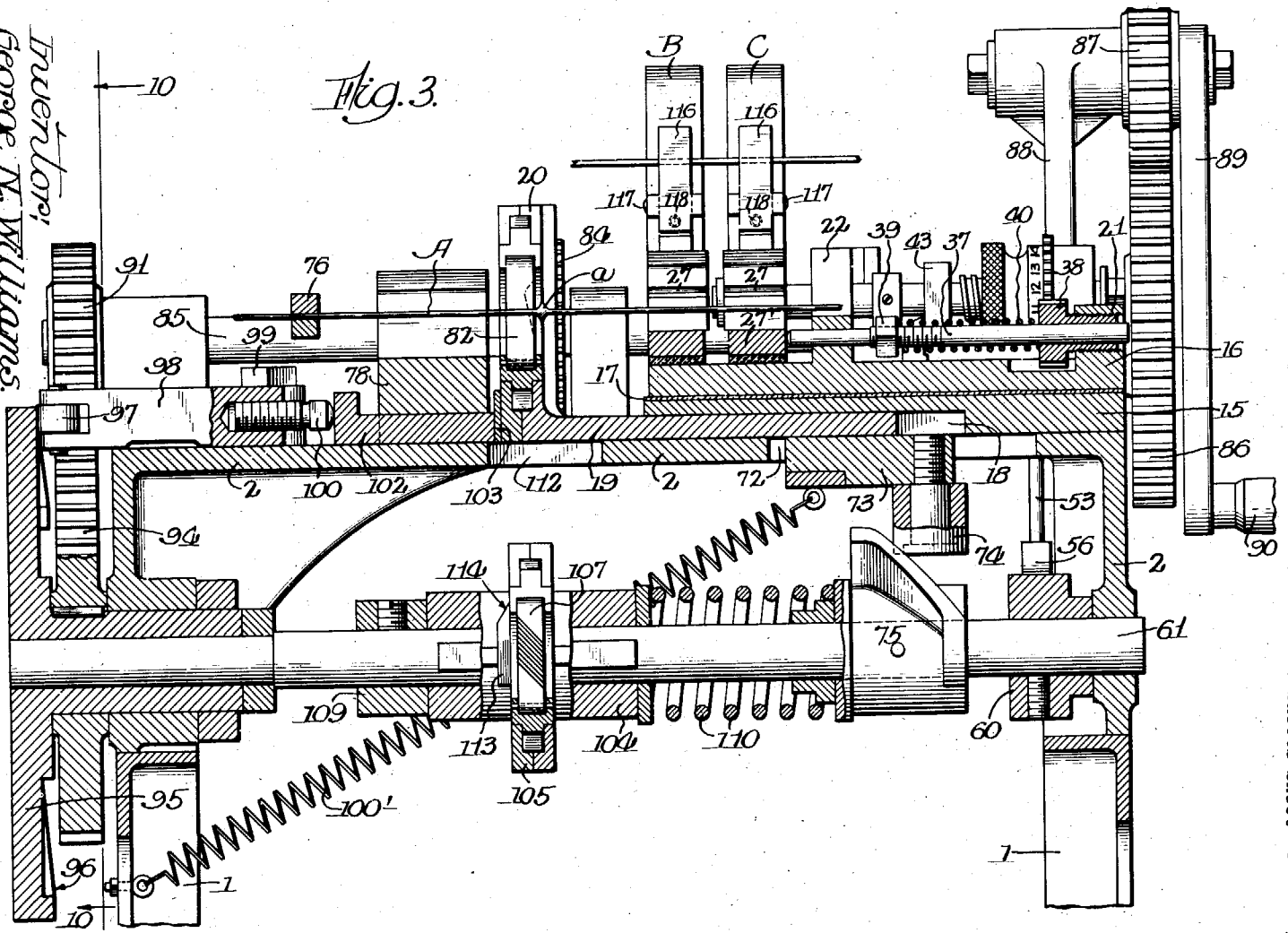
Fig. 3 is a front sectional view in elevation of the machine as the same would appear if taken on the line 3—3 of Fig. 2.

The bed frame 2, as will be observed in Fig. 3, is provided with suitable bearings to receive a shaft and component parts and also other operative parts to be hereinafter referred to. On this bed frame is supported a lower bed plate 15 and an upper bed plate 16 separated by a non-conductor of some suitable insulating material 17. The under side face of the lower bed plate 15, as shown in Fig. 3, is provided with an elongated open face recess 18 which, together with the upper face of the bed frame 2, on which the lower bed plate 15 rests, provides an elongated open ended slot in which is reciprocally arranged the frame extension 19 of a sectional support 20 to be further described. There are provided on the upper bed plate 16, as best seen in Fig. 2, the spaced bearing supports 21 and 22.

*Article gripping dies and co-acting mechanisms*

On the upper bed plate 16 and at or near its inner end is supported the article gripping dies for gripping or clamping the ends of the articles to be welded. These dies comprise two sets, one set including the stationary member 23 and the member 24 movable in relation thereto and the other set including the stationary member 25 and the member 26 movable in relation thereto. The set of members 23 and 24 have a fixed position on the bed plate, except that the member 24 is movable away from and toward the member 23. The set of dies comprising the members 25 and 26 are supported so that not only can the member 26 be moved to and from the member 25, but both of said members are capable of being moved away from and toward the corresponding members 23 and 24. The members 23 and 25 have a plurality of variable size grooves, recesses or notches 27 in their acting faces for the reception of different and selective sizes of articles to be welded and the opposing members 24 and 26, respectively, have preferably smooth faces, as shown, and when moved into coaction with their respective opposite members effectively and firmly secure the articles between the die members during the welding operation. The members 25 and 26 are connected, respectively, with a support 27' slidable on the upper surface of the bed plate 16 and associated with said support 27', in spaced relation, as shown in Fig. 2, is a non-rotatable rod 28 and a non-rotatable shaft 29, both of which pass through and have a bearing and longitudinal slidable relation through the spaced bearing supports 21 and 22, respectively, and it is through and by means of the rod 28 and the shaft 29, respectively, that the support 27' with the members 25 and 26 are held in correct alignment when moved laterally for the purpose of properly spacing the members 25 and 26 from the corresponding members 23 and 24.

The movable die member 24 is connected through a reciprocal member 30, operative within a housing 31, with a lever and cam means 32 whereby it is made possible to move the member 24 from and toward the member 23 and although not shown, there is a spring means within the housing 31 coacting with the reciprocal member 30 to move and hold the member 24 in gripping relation with an article placed between it and the member 23 when the lever and cam means 32 have been moved to position to permit such spring means to act. The movable die member 26 is connected through a reciprocal member 33, operable within a housing 34 of the movable support 27', with a lever and cam means 35 whereby it is made possible to move the member 26 from the member 25, and as shown in Fig. 4, there is a spring means within the housing 34 coacting with the reciprocal member 33 to move and hold the member 26 in gripping relation with an article placed between it and the member 25 when the lever and cam means 35 have been moved to position to permit such spring means to act. The spring means associated with the member 24 is substantially like that shown associated with the member 26. As shown in Fig. 3, the sets of dies and their supporting means are suitably insulated from the bed plate 16.

There is also disposed through the supports 22 and 21, respectively, the rod 37 which is adapted for longitudinal movement and its inner end is always in abutting relation with the support 27' and the members 25 and 26 carried thereby. The outer end of this rod 37, in addition to passing through the support 21, also passes through and has slidable relation in a preferably sleeved spur gear pinion 38, the sleeve of which has a threaded relation with the support 21, as is best seen in Fig. 3. On said rod 37 closely adjacent to the support 22 is a nut or similar member 39 between which and the face of the pinion 38 is carried a spring 40 which is coiled about the rod 37, as shown. The rod is threaded so that the nut 39 may be adjusted to increase or decrease the normal tension in the spring 40, as will be understood. It should be apparent that when the support 27' with the members 25 and 26 are moved from the members 23 and 24, that the rod 37 will be moved outwardly, compressing the spring 40 and placing the necessary tension therein, so that when the fusing of the articles takes place during the welding action, this spring 40 will act to move the members 25 and 26 toward the members 23 and 24 that the proper welding and fusing action may take place.

The rod 28 is secured at one end to the support 27' and is guided by and movable through the supports 22 and 21, respectively, as previously pointed out. The shaft 29 has suitable connection with the support 27', whereby to move the support 27' in one direction, that is, away from the members 23 and 24, and at its opposite or outer end said shaft passes through and has a slidable relation in the support 21 and on its outer end has connected thereto a flanged nut or collar 41. It will be apparent that as the support 27 with its set of die members 25 and 26 are moved away from the set of die members 23 and 24, the shaft 29 will be moved outwardly, moving the flanged nut 41 away from the support 21 and that during the fusing action and as the support 27' with the die members 25 and 26 are moved towards the die members 23 and 24, the flanged nut 41 will act as a limiting member so soon as this flanged nut comes into abutting engagement with the support 21.

The shaft 29 between the supports 22 and 21, respectively, is provided with several elements, one of which is an insulation block 42 adjustably secured to said shaft and in close proximity to the support 22. Suitably spaced from this block and secured for adjustment on the shaft 29 is an abutment block 43, and a substantial portion of the remainder of the shaft between such abutment block and the support 21, is formed or provided with a screw thread 44 coacting with a similarly internally screw threaded portion of an index nut 45. This nut has a milled portion 46 to enable an attendant to turn it on the shaft and with a circumferentially arranged numerical die spacing index 47 and a gear portion 48 which has a meshing relation with the sleeved pinion 38. The index on the nut 45 enables the attendant, through the operation of the nut, to predeterminately and selectively separate the set of dies 25 and 26 from the set of dies 23 and 24 the distance necessary for the proper and effective welding of the ends of the articles being welded so that there will be the required amount of material in the end of each article to provide an effectual and adequate weld. The character of index to be selected for the particular machine embodying these improvements will be an arbitrary matter and, as shown in this instance, is designed for butt welding the ends of wires ranging in gauges from zero to 16 gauge; however, this is not to be construed as a limitation but merely as an exemplification of the uses to which the machine may be put. In the instant showing, the index shows that the sets of dies have been separated to accommodate the welding of wires of No. 15 gauge and that the attendant on actuating the index has separated the sets of dies to accommodate the machine to wires of No. 15 gauge and in doing so, when rotating the gear 48, has correspondingly rotated the sleeved pinion 38, but in an opposite direction. The screw threads 44 on the shaft 29 and the screw threads on the sleeved pinion 38 are such as to facilitate the outward movement of the shaft 29 and the inward movement of the sleeved pinion 38 whereby, the latter has a sliding relation in respect to the gear 48. When the welding action takes place and the wires are fused, it will naturally follow that the set of dies 25 and 26 will automatically move under the action of the spring 40, toward the set of dies 23 and 24, and the gear 48 forming a part of the index nut will be moved with the shaft 29, the gear 48 sliding on the sleeved pinion 38. In other words, during welding there is a bodily movement of the shaft 29 and index nut 45 toward the sets of dies. When actuating the index nut, to set the members 26 and 25 for welding, the outside face of the gear 48 will bear against the support 21, the sleeved pinion 38 being caused to move inwardly, the rod 37 being forced outwardly will automatically and predeterminately properly tension the spring 40 for effective action on the different sizes of materials to be welded. During the fusing action, and as indicated, the shaft 29 and the indexing nut 45 will move bodily forward in unison; moving the gear 48 from the support 21, disconnection of the gear 48 from the sleeved pinion 33 being prevented because the latter has been moved forwardly during the setting and there is sufficient surface space on the said pinion on which the gear 48 may slide. It will be understood, that an operator may continue to weld No. 15 gauge wires, as illustrated, without any further manipulation of the indexing device and that when welding gauges of wire other than No. 15 gauge, it will require only a simple thumbing of the indexing device to set such device to accommodate the machine to whatever gauges of wire it is desired to weld.

It will be obvious that when the indexing nut has been manipulated to predeterminately space the members 25 and 26 from the members 23 and 24, that unless means were provided to hold the members 25 and 26 and associated elements in such adjusted positions, they would be returned to initial starting position under the natural expansion action of the spring 40, and difficulty would be encountered in placing the articles to be welded in abutting relation between the sets of members 23 and 24, and 25 and 26 and the members adjusted in clamping positions on said articles. To prevent this and to enable the attendant to have freedom of action in placing the articles for welding, there is provided the abutment block 43 arranged for adjustment securely on the shaft 29, see Fig. 5. Arranged for coaction with said abutment block 43 is a pivotally supported stop member 49. This member is secured on the inner end of a rockable rod 50 journaled in the bed plate 16 and also in a bearing support 51 mounted on the bed frame 2, see Figs. 4 and 5. To the outer end of said rod 50 is connetced a crank-arm 52 which has connected thereto the reciprocal rod 53 which passes down through the outer end of a lever arm 54 united in a common hub 55 from which extends a pawl or finger 56. The lower projecting end portion of the rod 53 has coiled thereabout a compensating spring 57, which bears at one end against said lever arm 54 and at its opposite end against nuts 58 adjustable on the lower end of said rod 53. Through said rod, immediately above and in engagement with said lever arm is carried a pin 59. The pawl or finger 56 rides on a cam 60 secured to a shaft 61 which is journaled in suitable bearings in opposite walls of the bed frame 2, see Figs. 3 and 4. The cam is provided with an operator's handle 62. Immediately on the adjustment of the indexing nut 45, resulting in setting the members 25 and 26 in spaced relation to the members 23 and 24, due to the outward movement of the shaft 29, the attendant will see to it that the operator's handle 62 is moved to its lowermost position, as seen in Figs. 1 and 4, to insure that the stop member 49 is in engagement with the abutment member 43, see Fig. 5, to hold the adjusted elements in position to permit the placement of the articles to be welded in abutting relation between the members 23 and 24, and 25 and 26 and said sets of members in clamping engagement with such articles. As soon as the articles are secured for welding action, then the attendant will raise the handle 62 in locking engagement with the catch 63, by causing the latch 63' to engage the same, see Fig. 1, being the dotted line position of the handle 62 in Fig. 1, which movement will partially rotate the cam 60, moving the irregular face of the cam, see Fig. 4, under the pawl or finger 56 of the lever arm 54 which latter arm is caused to exert an upward thrust against the pin 59 and raise the rod 53 whereby to actuate the arm 52 to release the stop member 49 from engagement with the abutment block 43, so that when the welding action is started and fusing of the articles takes place, the shaft 29, the indexing nut 45, the rod 28 and the support 27' are free to move bodily forward under the action of the spring 40 and the rod 37 to effect the efficient welding of the articles. The spring 57 serves as a flexible and compensating means to take care of the variation in the travel of members 25 and 26, and associated parts, during their adjustment for different gauges of wires. The shaft 61 carrying the cam 60 and the handle 62 function additionally, as will be pointed out, to effect burr removing, as well as dressing and smoothing down the weld, after the welding action.

*Cutting mechanism for preparing ends of articles to be welded*

To obtain an effective weld of abutting ends of metallic articles, as for example, iron or steel wire, clean and smooth ends of the wires are desirable and I accomplish this preparation of the ends of such wires by severing short ends therefrom. At or near the end of the bed frame 2, at one side and removed from the welding mechanism, see Fig. 2, I provide the cutting mechanism including a support 64 having the open ended barrel 65. In said barrel are disposed the stationary cutters 66 having a plurality of articles receiving openings 67 therethrough; the movable cutter 68 having a hand actuatable handle 69, whereby to oscillate said cutter, and further provided with a plurality of article receiving openings 70 arranged to be brought into coincident relation with the openings 67 in the cutter 66. It will, of course, be obvious that when an article, as for example, a wire, is inserted through aligned openings in said cutters and the cutter 68 is oscillated that the wire will be severed in two, producing a clean cut end for welding. The cutters are retained in operative relation with each in the barrel 65, by the removable closure 71 threaded into one end of said barrel. By removing said closure, the cutters may be removed, reinserted or others substituted therefor, as occasion may require.

*Initial burr removing means and coacting mechanisms*

Reference has previously been made to the sectional support 20 forming a part of the reciprocally arranged frame extension 19, the latter arranged and slidably movable within the elongated open-faced recess 18 located between the upper face of the bed frame 2 and the lower cut-out face of the bed plate 15. The bed frame 2 is provided with the elongated slot 72 in which is slidably arranged the plate 73 secured to the frame extension 19 of said sectional support 20 and depending from this plate 73 is a roller 74 adapted to be acted upon by the cam 75 secured to the shaft 61, the latter, as previously noted, being adapted to be oscillated by means of the handle 62. The sectional frame 20 provides the support for the means for initially cutting burrs formed on the article welded, as a result of the welding action.

It being assumed that one of the articles or pieces of wire to be welded is of some considerable length, it would be slipped down into the sectional support 20 and into coacting relation with the means for initially cutting the burr formed by the welding action. To bring such a burr into position to be acted upon by this mechanism, the members 24 and 26 of the sets of dies will be moved to release the article or the wire, as the case may be, which is firmly held between the sets constituting these members and when this has been done, the attendant, through and by means of pliers 76, see Fig. 2, will grip the welded article, or the wire, as the case may be, and by a back and forth reciprocal motion causing the pliers to be alternately gripped and released, move the welded portion of the article from the point of welding to the point shown in Fig. 2 and 3, preparatory to the action of the initial cutting mechanism. This plier, as such pliers are ordinarily constructed, comprises two pivoted members with gripping jaws and in this particular instance, the same has lateral sliding movement on the base 77 secured to the bed frame 2, as shown. When the positioning of the welded and burr portion of the article has been accomplished, then the article is firmly gripped in a vise comprising a stationary section 78 and a movable section 79, the latter arranged for movement toward and from the other by means of the handle 80. This vice, as indicated in Fig. 2, is supported in a fixed position on the bed frame 2, with the exception, as noted, that it comprises a fixed and movable section.

In further explanation of the usefulness of the mechanism being described, a welded article, as for example a wire, is designated A having formed thereon, as a result of the welding action, the burr *a* and this burr, as shown in Figs. 2 and 3, is in position to be acted upon by the initial burr cutting mechanism.

Referring now to the sectional support 20, it has arranged therewithin the split gear 81 within the hub of which are pivoted for coacting relation the cutting tools 82, yieldingly held for coacting relation by means of springs 83. Fig. 7 shows the wire A positioned within this cutting mechanism and with the burr *a* ready to be acted upon by the cutting tools 82. The springs 83 yield when the article, as for example the wire, is passed down through the split portion of the gear 81 into position to be acted upon by the cutting tools and such springs further apply the force necessary for the tools to act upon the burr. In operation this initial burr cutting mechanism has reciprocal movement longitudinally of the article having the burr and is also rotatable whereby the projecting or ragged portions of the burr may be removed. As shown in Fig. 6, the position of the cutting tools is maintained in proper alignment with the split portion of the gear to facilitate the easy placement of the article with its burr in position for the latter to be acted upon.

In meshing relation with the split gear 81 is an operating gear 84 carried on a shaft 85 which is journaled in suitable bearings on the bed frame 2 and extends the length of said frame. To one end of this shaft is secured preferably an enlarged gear wheel 86 and in mesh with said gear wheel is a pinion 87 journaled on a short shaft having a bearing in a support 88 carried by the bed frame, see Figs. 2 and 3. Connected with the shaft carrying the pinion 87 is a crank arm 89 provided with a handle 90 whereby to impart rotatable movement to the pinion 87 and through it to the gear 86 and the shaft 85. Such rotation of this shaft 85, as will be understood, will impart rotation to the gear 84 and through it rotation to the split gear 81.

To the opposite end of the shaft 85 is connected a gear wheel 91 in meshing relation with a gear wheel 92 carried by a short counter shaft 93, suitably journaled in the bed frame 2, as shown in Figs. 4 and 6, and said gear wheel 92 is in meshing relation with a larger gear wheel 94 keyed to an elongated hub of a cam wheel 95 carried on the shaft 61, and rotatable thereon, but not rotatable thereby. In other words, free to rotate on said shaft 61. This cam wheel is formed or provided with a circumferential series of successively disposed cam faces 96 and is preferably shown as being provided with a greater number of such cam faces extending 180 degrees around the cam and with a lesser number the remainder of the 180 degrees, although this is not absolutely necessary as expediency may determine otherwise. These cam faces are adapted to ride over and against a roller 97 journaled in the end of a bell crank shaped arm 98 which has a pivotal connection at one end at 99 with the bed frame, as shown. At the juncture of this bell crank shaped arm is adjustably carried a hammer 100, secured in its adjusted position by means of the nut 101. Said hammer during its reciprocal movement as the result of the cam riding against the roller 97 will engage with a reciprocally arranged hardened steel plate 102, see Figs. 3 and 8, which has a slidable relation on the upper surface of the bed frame 2 and within a slotted opening provided therefor in the vise 78. This plate 102 at its opposite end, in the instant showing, bears against a hardened steel plate 103 secured to the face of the sectional support 20. In operation, the attendant, by rotating the crank arm 89, will impart through the elements described, rotatable movement to the gear wheel 94 and the cam 95 to which it is connected and the latter will impart during such rotation reciprocal movement to the bell crank shaped arm 98, and by a succession of blows through the hammer 100 on the plate 102, will impart alternate reciprocal movement to the support 20 and through the action of the cutting tools 82, will initially and partially cut the burr *a* preparatory to the final dressing action of parts to be described, it being understood, of course, that during such reciprocal movement of the hammer 100, the gear 84 imparts rotatable movement to the split gear 81, as previously described. In practice it has been found that the initial cutting action, described, may be accomplished by a one-half rotation of the cam 95 and that the gear ratio to accomplish this, with the means shown, requires only two rotations of the crank arm 89. This need not be construed as a limitation but as an expediency adapted to accomplish the results herein sought.

The hammer 100, under the action of the operative parts previously described, will impart reciprocal movement in one direction to the cutting mechanism carried by the sectional support 20, against the action of a spring 100′, which on the release of the hammer will act to return the support 20 into position to be again and successively acted upon by said hammer 100, this spring being connected at one end to the under side of the plate 73, and its opposite end to one of the standards of the support 1, as shown in Fig. 3.

*Final burr removing and dressing down mechanism and associated parts*

Connected to the shaft 61 and adapted for reciprocation thereon is a support 104 provided with a sectional head 105 somewhat similar to the sectional support 20 and in this head is rotatably journaled a split gear wheel 106, somewhat similar to the split gear wheel 81 and within this split gear are pivotally supported in proper alignment with the split portion of the gear, filing or dressing tools 107. These tools function similarly to the cutting tools 82 except that the active faces of the tools 107 are designed for a dressing down action instead of a cutting action as is accomplished by the operation of the tools 82. The tools 107 are retained yieldingly in their operative positions by means of the springs 108 which function somewhat similarly to the springs 83. The support 104 is limited in one of its directions of movement by the block 109 secured to the shaft 61 and may be reciprocated away therefrom and back thereto against the spring 110 coiled about the shaft 61 and disposed between the support 104 and the cam 75 so that when the support is in operative position, as will be described, and reciprocal movement is imparted thereto, in a manner to be described, it will act in one direction against the spring 110 and be forced back in the opposite direction by said spring.

In the normal inoperative position of the support 104 it is in substantially the position shown in Figs. 1 and 6 and the radius from the shaft 61 to the split portion of the gear wheel 106 is of a distance so that when the shaft 61 is moved to raise the support 104 to bring the axis of the gear 106 into proper working position, the article on which the burr is to be dressed, as for example the wire A, will be in a position to slip into the split portion of the gear 106, when the support 104 has been moved from a substantially horizontal to a substantially vertical position.

Figure 8:
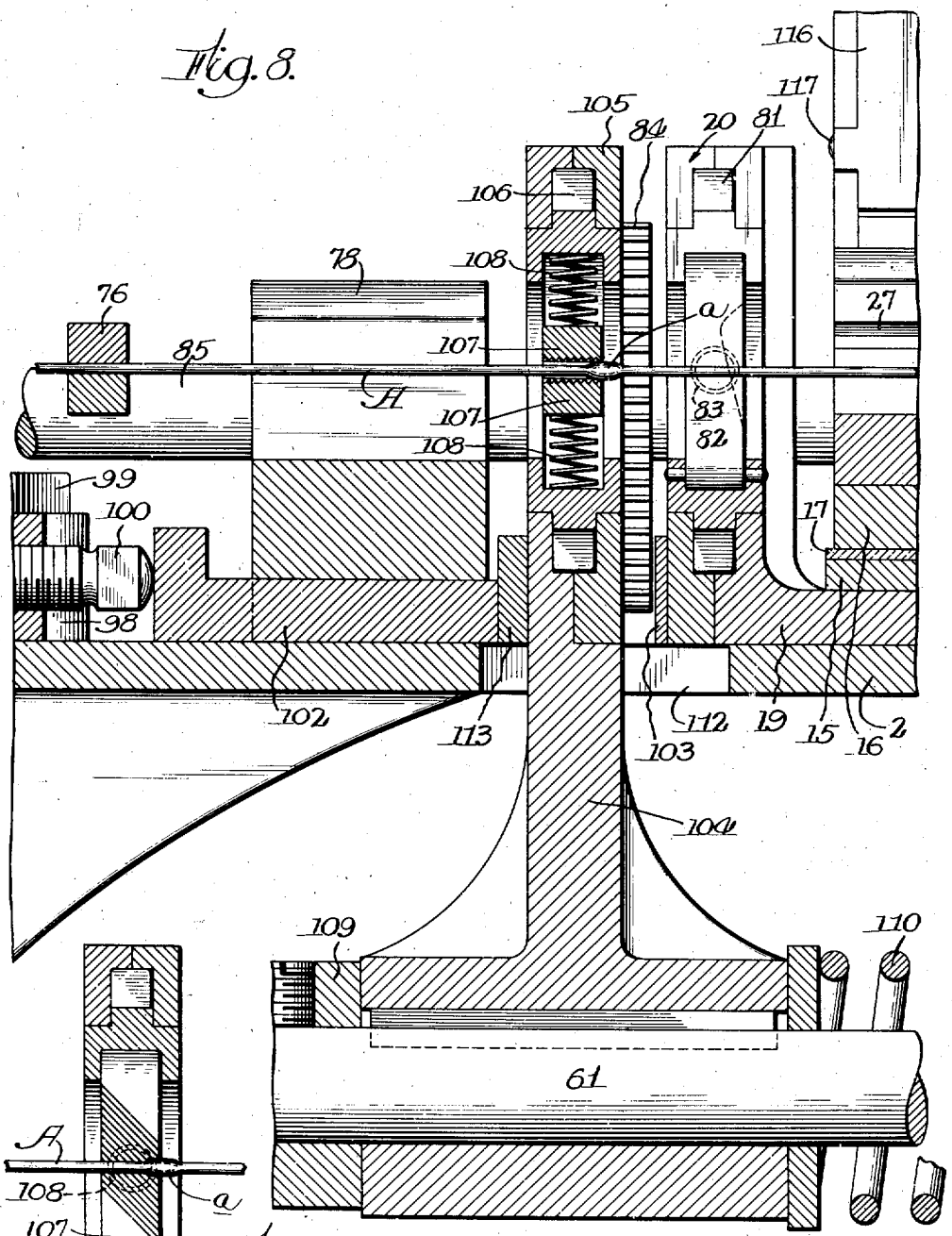
Fig. 8 is an enlarged detailed sectional elevation illustrating the operative position assumed by the final burr removing elements and the association therewith of the partially removed burr of a section of welded wire, the initial burr removing element having been displaced to non burr acting or inoperative position.
Figure 9:
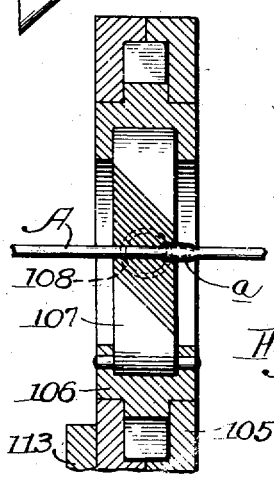
Fig. 9 is a sectional view in plan of the final burr removing element as shown in Fig. 8.
Figure 10:
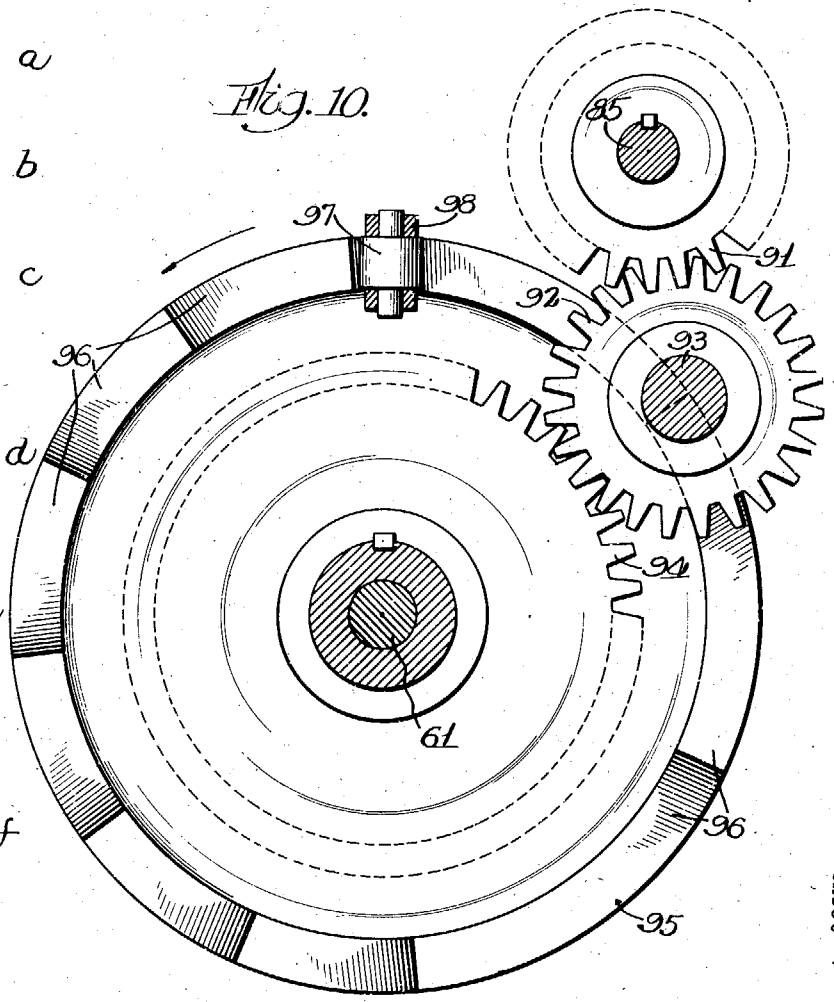
Fig. 10 is an enlarged sectional detail of a certain cam mechanism as the same would appear if taken on the line 10—10 of Fig. 3, certain gears associated with the figure being more or less diagrammatically shown.

Assuming now that the welding has been accomplished and the article welded moved to the position previously described for the initial cutting action on the burr *a* and such initial cutting action completed, the handle 62 connected with the shaft 61 being in either the position shown in full lines in Fig. 1 or in dotted lines in the said figure, will be moved to its extreme upper position so that the latch 63' will engage in a catch 111 secured to the bed frame 2, as shown in Fig. 1, and in which said figure the handle 62 is shown in dotted lines moved into said upward position. On moving the handle from one of its lower positions to its extreme upper position, it will cause the cam 75 to ride against the roller 74 and through such action move the plate 73 and the frame extension with its sectional support 20 from the position in which it is shown in Fig. 3 to the forward position in which it is shown in Fig. 8, the reduced burr *a* riding between the faces of the cutters 82 during such movement and forward adjustment of the sectional support 20. Simultaneously with this partial rotation of the shaft 61, the support 104 will be moved from the position in which it is shown in Figs. 1 and 6 to the operative position in which it is shown in Fig. 8, the article, or as the case may be, the wire A sliding into the split portion of the gear 106 and between the filing or dressing down tools 107 and into the position substantially shown in Fig. 8 preparatory to the action of the tools 107 for dressing down the burr *a*. During such movement of the parts the gear 81 moves out of mesh with the gear 84 and the gear 86, as is apparent, will move into meshing relation with said gear 84 to be actuated thereby on the operation of the crank arm 89. To permit the placement and retraction of the support 104, the bed frame is slotted in its vertical and horizontal faces as shown at 112. To one face of the head 105 is secured a hardened steel plate 113 having a beveled edge 114, see Fig. 3, and this plate when the support 104 has been moved into operative position, rides past an end of the hardened steel plate 102 so as to bring the head with its plate 113 into cooperative relation with the plate 102. The reciprocation of the support 104 on the shaft 61 is accomplished through the same hammer mechanism and parts for actuating the same as described in connection with the reciprocal movement imparted to the sectional support 20 carrying the cutters 82, the operative position of the parts, just described, being shown in Fig. 8, preparatory to completing the final dressing down action of the burr. It is to be assumed that the crank arm 89 which has been rotated two revolutions in connection with the initial cutting operating of the burr is left in that position so that when the final dressing down action begins, the attendant will impart two additional complete rotations to the crank arm 89 and cause the cam 95 to finish a complete revolution and in so doing impart a series of short reciprocal movements to the support 104 and through the action of the tools 107 file the burr smoothly down to the diameter of the article, assuming that the article is a wire. By reference to Fig. 10, it will be seen that the face of the cam 96 has a series of long and comparatively slow successively acting cam faces on the right hand side arranged throughout 180 degrees of its surface and that on the remainder of the 180 degrees of surface there are a greater number of cam faces, whereby to produce the series of short and quickly successive reciprocations of the support 104. It is of course understood that in the instant showing the cutting and filing actions produced by the cam are accomplished through one complete rotation of the cam 96 and that while I have elected to show an arrangement of cam faces, long on one side and short on the other, these faces may be rearranged and provided in such order as expediency may suggest or require. Furthermore, the gear ratio shown may be rearranged to accommodate any changes which may be made in the cam.

In Fig. 11, there is diagrammatically shown the several steps from the initial preparation of the article to its finish, including the step of cutting the ends of the sections of the article to be welded; the welding action when the articles are brought into abutting relation; the welded article with the resultant burr *a*; the burr having been initially treated, preparatory to being filed and smoothed down, and the final article as it would appear after the complete dressing down action by the tools 107.

*Power source and appliances for welding*

I have elected to show a mode of electrical heating for the welding action, but since no claim is to be made on the electrical heating or its equipment, it will not be necessary to describe more than a simple means for accomplishing this purpose.

The current generated by the electrical equipment is designed to pass through one set of dies, the article to be welded and out through the other set of dies as is customary in machines of this character. In Figs. 1, 3 and 4, I have shown connected with one set of dies buss bars B and to the other set of dies buss bars C. Both sets of bars are connected to a transformer D supported by the rest or platform 3 and said transformer is suitably connected with a magnetic switch E also supported by said platform or rest 3 and the magnetic switch E is connected with a switch box F secured to a side of the bed frame 2 and said switch box is provided with starting and stopping buttons *f* and *f'*. The magnetic switch in turn has connected thereto a lead-in cable G normally wrapped on a cleat H secured to the supporting frame and said cable provided with a block *g* adapted for connection with a suitable electrical current socket, not shown.

The article to be welded being in position for the welding action, the attendant will push the starting button *f*, as will be understood, and during any emergency, while the current is on, he can shut off the current by the operation of the stop button *f'*.

I have provided means for automatically actuating the electrical switch for cutting off the current immediately on the completion of the welding action. This means is best seen in Figs. 2 and 2ª. Connected with the fixed support 22 is a block I of suitable nonconducting material which carries terminals *i* and *i'* as shown in Fig. 2ª and also a switch plate J having a permanent connection with the terminal *i'* and arranged for a breaking and contact relation with the terminal *i*, as shown. Arranged for operation through the block I is a pin K which is secured at one end to the block 42 and adapted during the movement of said block with the shaft 29 to engage and move the plate J, whereby to break the contact between said plate and the terminal *i*, resulting in shutting off the current on the completion of the weld. Conductors, as will be understood, lead from the terminals *i* and *i'* to a proper electrical power source, not shown.

*Annealing means*

Due to a very high heat generated in the butt welding of the metallic articles, there is usually found a spot a short distance away from the weld where there is a sharp line of demarkation between the high heat zone and the unaffected part or parts of the article or articles so that there is either a very coarse crystalline structure at this point or there is a sharp gradation between the grain size, but whatever it is there is a very brittle spot at the point of welding on both sides of the weld. It may be that this is due to a very severe grain distortion of some kind. In any event, when the metallic article is heated up to an annealing temperature, this structure readjusts itself and the brittle spot is completely removed. I have, therefore, designed in connection with this machine, a means for annealing the welded article, preferably after the dressing down action of the burr, although it may be found desirable to use it at any time following the welding action. This means comprises, as shown in Figs. 2, 3 and 4, two sets of cooperating jaws 115 and 116, respectively, in association with the sets of dies, one set of jaws being also associated with buss bars B and the other set being associated with the buss bars C. In each instance the jaw 116 has a pivotal relation at 117 with its jaw 115 and normally held in closed relation by means of a spring 118 which, while it holds the jaws in closed relation, will permit the jaws to be open for the placement of the welded article therebetween, as shown in Figs. 3 and 11 (*f*), the mode of heating the annealing jaws being controlled through the actuation of the starting and stopping buttons of the switch box previously described.

What I claim is:—

1. In a welding machine, in combination, a frame support, two sets of wire engaging members, one set being movable in relation to the other set and each set including a member movable in relation to its other member, means for moving the movable set of members in predetermined and selective positions from the other set of members, means for holding said set of movable members during the placement of wires between the said sets of members preparatory to welding, means to release said holding means, means to apply heat for welding, yieldable means adapted to be put under tension on the adjustment of said movable set of members and operative during fusing of the wires to move the movable set of members toward the other set of members, means for initially removing excess burr formation produced by the operation of welding comprising a rotating member and coacting tools carried thereby, other means for finally removing all semblance of burr formation included in the area of the weld comprising another rotating member and coacting tools carried thereby, and a common actuating means adapted for successively rotating said members while at the same time imparting reciprocal movement thereto.

2. In a welding machine, in combination, a frame support, two sets of wire engaging members, one set being movable in relation to the other set and each set including a member movable in relation to its other member, means for moving the movable set of members to predetermined and selective positions from the other set of members, means for holding said set of movable members during the placement of wires between the said sets of members preparatory to welding, means to release said holding means, means to apply heat for welding, yieldable means adapted to be put under tension on the adjustment of said movable set of members and operative during fusing of the wires to move the movable set of members toward the other set of members, means for initially removing excess burr formation produced by the operation of welding comprising a rotating member and coacting tools carried thereby, other means for finally removing all semblance of burr formation included in the area of the weld comprising another rotating member and coacting tools carried thereby, a common actuating means adapted for successively rotating said members while at the same time imparting reciprocal movement thereto and means for annealing the welded wire throughout the area affected by such welding subsequently to the burr removing operations.

3. In a welding machine, in combination, a supporting frame, two sets of article engaging members, one set being movable in relation to the other set and each set including a member movable in relation to its other member, guiding means for said movable set of members including a non-rotatable shaft for moving said movable set of members away from said other set and provided with a threaded portion, an indexing nut in threaded engagement with the threaded portion of said shaft for predeterminately adjusting the movable set of members in their relation to the other set, spring means adapted to be put under tension by the adjustment of said movable set of members and to operate to move the movable set of members toward the other set on fusing of the articles, means actuated by said indexing nut for predeterminately tensioning said spring, means to hold said shaft and said movable set of members when adjusted to permit placement of articles to be welded, means to release said holding means, means to apply heat to the articles for welding, means for initially removing excess burr formation produced by the operation of welding, other means for finally removing all semblance of burr formation included in the area of the weld and a common actuating means for operating said initial burr removing means and said final burr removing means.

4. In a welding machine, in combination with article securing means and heat applying means for welding, of a burr reducing means adapted to initially act on the burr for removing excess metal incident to the burr formation, other means to finally smooth the welded article at the point of welding to remove any semblance of burr formation, and a common actuating means for successively operating said initial burr reducing and smoothing means.

5. In a welding machine, in combination with article securing means and heat applying means for welding, of a burr reducing means adapted to initially act on the burr for removing excess metal incident to the burr formation, other means to impart rotating and reciprocal movement to said reducing means, means to finally smooth the welded article at the point of welding to remove any semblance of burr formation, means to impart rotating and reciprocal movement to said smoothing means and a common actuating means for successively operating said initial burr reducing and smoothing means.

6. In a welding machine, in combination with article securing means and heat applying means for welding, of a burr reducing means adapted to initially act on the burr for removing excess metal incident to the burr formation, other means to finally smooth the welded article at the point of welding to remove any semblance of burr formation and a common actuating means adapted for successively imparting rotating and reciprocal movement to said initial burr reducing and smoothing means.

7. In a welding machine, in combination with article securing means and heat applying means for welding, of an initial burr reducing means adapted to act on the burr, including a rotating member and coacting tools carried thereby, means to finally smooth the welded article at the point of welding to remove any semblance of burr formation including a rotating member and coacting tools carried thereby, and a common actuating means adapted for successively rotating said members while at the same time imparting reciprocal movement thereto.

8. In a welding machine, in combination with articles securing means and heat applying means for welding, of an initial burr reducing means adapted to act on the burr including a split gear and yieldably separable coacting tools carried thereby, means to finally smooth the welded article at the point of welding to remove any semblance of burr formation including a split gear and yieldably separable coacting tools carried thereby, and a common actuating means including gearing adapted to successively rotate said split gears while at the same time impart reciprocal movement thereto.

9. In a welding machine, in combination, a support, an initial burr reducing means reciprocally arranged on said support and including a split gear and coacting tools carried thereby, means for positioning said reducing means into operative and inoperative positions, a burr smoothng means adapted to finally smooth the welded article at the point of welding to remove any semblance of burr formation including a split gear and coacting tools carried thereby, means for supporting said smoothing means out of the way of work and in inoperative position, and means for moving said smoothing means into work engaging and operative position, while at the same time moving said initial burr reducing means to inoperative position, and a common actuating means for both said initial and burr smoothing means adapted for successively imparting rotative movement thereto while at the same time imparting reciprocal movement to the same.

10. In a welding machine, in combination, work holding means, heat applying means, a rotative and reciprocal means for initially reducing a burr formed by welding, a rotative and reciprocal means for finally smoothing the welded article at the point of welding to remove any semblance of burr formation, means for simultaneously displacing said initial burr reducing and smoothing means, whereby to place one or the other into an operative position, a common actuating means for imparting rotative as well as reciprocal movement to either of said initial burr reducing or smoothing means when in operative position, and means for annealing the welded article throughout the area affected by such welding.

11. In a welding machine, in combination, work holding means, heat applying means, a rotative and reciprocal means for initially reducing a burr formed by welding, a rotative and reciprocal means for finally smoothing the welded article at the point of welding to remove any semblance of burr formation, means for simultaneously displacing said initial burr reducing and smoothing means, whereby to place one or the other into an operative position, and a common actuating means for imparting rotative as well as reciprocal movement to either of said initial burr reducing or smoothing means when in operative position.

12. A machine for treating the welded area of metallic articles comprising article securing means, means for initially acting on the welded area of said article for reducing excess burr formation incident to the weld, other means for finally acting on the welded and reduced area of said article for removing all semblance of burr formation, and a common actuating means for successively operating said initial burr reducing and final burr removing means.

13. A machine for treating the welded area of metallic articles comprising article securing means, means for initially acting on the welded area of said article for reducing excess burr formation incident to the weld, means to impart rotating and reciprocal movement to said initial burr reducing means, means for finally acting on the welded and reduced area of said article for removing all semblance of burr formation, means to impart rotating and reciprocal movement to said final burr removing means, and a common actuating means for successively operating said initial burr reducing and final burr removing means.

14. A machine for treating the welded area of metallic articles comprising article securing means, means for initially acting on the welded area of said article for reducing excess burr formation incident to the weld, other means for finally acting on the welded and reduced area of said article for removing all semblance of burr formation, and a common actuating means adapted for successively imparting rotating and reciprocal movement to said initial burr reducing and final burr removing means.

15. A machine for treating the welded area of metallic articles comprising article securing means, means for initially acting on the welded area of said article for reducing excess burr formation incident to the weld, including a rotating member and coacting wearing tools carried thereby, other means for finally acting on the welded and reduced area of said article for removing all semblance of burr formation, including a rotating member and coacting wearing tools carried thereby, and a common actuating means adapted for successively rotating said members and associated tools while at the same time imparting reciprocal movement thereto.

16. A machine for treating the welded area of metallic articles comprising article securing means, means for initially acting on the welded area of said article for reducing excess burr formation incident to the weld, including a split gear and yieldably separable coacting wearing tools carried thereby, other means for finally acting on the welded and reduced area of said article for removing all semblance of burr formation, including a split gear and yieldably separable coacting wearing tools carried thereby, and a common actuating means including gearing adapted to successively rotate said gears and associated tools while at the same time impart reciprocal movement thereto.

17. In a machine for treating the welded area of metallic articles, in combination, article securing means, a rotative and reciprocal means for initially acting on the welded area of said article for reducing excess burr formation incident to the weld, a rotative and reciprocal means for finally acting on the welded and reduced area of said article for removing all semblance of burr formation, means for displacing said initial burr reducing and final burr removing means whereby to place one or the other into an operative position, and a common actuating means for imparting rotative and reciprocal movement to either of said initial burr reducing and final burr removing means when in operative position.

18. In a machine for treating the welded area of metallic articles, in combination, article securing means, a rotative and reciprocal means for initially acting on the welded area of said article for reducing excess burr formation incident to the weld, a rotative and reciprocal means for finally acting on the welded and reduced area of said article for removing all semblance of burr formation, means for displacing said initial burr reducing and final burr removing means whereby to place one or the other into an operative position, a common actuating means for imparting rotative and reciprocal movement to either of said initial burr reducing and final burr removing means when in operative position, and means for annealing the treated and finished welded area of said article.

19. A machine for treating the welded area of metallic articles comprising article securing means, means for acting on the welded area of said article for reducing burr formation incident to the weld, including a rotating member and coacting wearing tools carried thereby and means adapted for giving rotative movement to said member and associated tools while at the same time imparting reciprocal movement thereto.

20. A machine for treating the welded area of metallic articles comprising article securing means, means for acting on the welded area of said article for reducing burr formation incident to the weld, including a split gear and yieldably separable coacting wearing tools carried thereby and means adapted for giving rotative movement to said gear and associated tools while at the same time imparting reciprocal movement thereto.

GEORGE N. WILLIAMS.